US010781348B2

(12) United States Patent
Sörensen et al.

(10) Patent No.: US 10,781,348 B2
(45) Date of Patent: Sep. 22, 2020

(54) INHIBITED AQUEOUS DEICING COMPOSITION

(71) Applicant: PERSTORP AB, Perstorp (SE)

(72) Inventors: Kent Sörensen, Perstorp (SE); Marie Westerblad, Hässleholm (SE)

(73) Assignee: PERSTORP AB, Perstorp (SE)

( * ) Notice: Subject to any disclaimer, the term of this patent is extended or adjusted under 35 U.S.C. 154(b) by 33 days.

(21) Appl. No.: 16/308,153

(22) PCT Filed: Jun. 15, 2017

(86) PCT No.: PCT/SE2017/050643
§ 371 (c)(1),
(2) Date: Dec. 7, 2018

(87) PCT Pub. No.: WO2018/004423
PCT Pub. Date: Jan. 4, 2018

(65) Prior Publication Data
US 2019/0264083 A1    Aug. 29, 2019

(30) Foreign Application Priority Data
Jun. 30, 2016   (SE) ...................................... 1630169

(51) Int. Cl.
*C09K 3/18*     (2006.01)
*G01S 17/32*    (2020.01)
*G01S 17/42*    (2006.01)
*B64D 15/06*    (2006.01)

(52) U.S. Cl.
CPC ............. *C09K 3/18* (2013.01); *C09K 3/185* (2013.01); *G01S 17/32* (2013.01); *G01S 17/42* (2013.01); *B64D 15/06* (2013.01)

(58) Field of Classification Search
CPC .......... C09K 3/18; C09K 3/185; G01S 17/32; G01S 17/42; B64D 15/06
See application file for complete search history.

(56) References Cited

U.S. PATENT DOCUMENTS

| | | | | |
|---|---|---|---|---|
| 6,059,989 A * | 5/2000 | Stankowiak | ............ | C07C 53/06 252/70 |
| 6,156,226 A * | 12/2000 | Klyosov | .................. | C09K 3/18 106/13 |
| 6,596,189 B1 * | 7/2003 | Moles | .................... | C09K 3/185 252/70 |
| 6,623,657 B1 * | 9/2003 | Berglund | ................. | C09K 3/18 106/13 |
| 6,846,431 B1 * | 1/2005 | Dunuwila | ................ | C09K 5/20 252/71 |
| 7,063,803 B2 * | 6/2006 | Seo | .......................... | C09K 3/18 106/13 |
| 7,276,179 B2 * | 10/2007 | Seo | .......................... | C09K 3/18 106/13 |
| 7,938,981 B2 * | 5/2011 | Dunuwila | ................ | C09K 3/18 106/13 |
| 8,057,695 B2 * | 11/2011 | Lievens | ................. | C09K 3/185 252/71 |
| 9,309,449 B2 * | 4/2016 | Koefod | ..................... | C09K 3/18 |
| 9,434,868 B2 * | 9/2016 | McConnell | ............ | C09K 3/185 |
| 2006/0163528 A1 | 7/2006 | Wenderoth et al. | | |
| 2009/0001313 A1 | 1/2009 | Lievens et al. | | |
| 2009/0250654 A1 | 10/2009 | Lievens et al. | | |
| 2014/0138105 A1 | 5/2014 | Kuwatch et al. | | |

FOREIGN PATENT DOCUMENTS

DE          4034217 A1 *   5/1991   ............... C09K 5/20

OTHER PUBLICATIONS

International Search Report and Written Opinion dated Jul. 7, 2017 for corresponding PCT Application No. PCT/SE2017/050643.

* cited by examiner

*Primary Examiner* — Anthony J Green
(74) *Attorney, Agent, or Firm* — Polsinelli PC

(57) ABSTRACT

Disclosed is an aqueous deicing and/or anti-icing composition, and the use thereof on areas in need of deicing and/or anti-icing, exhibiting substantially improved corrosion inhibition, conductivity inhibition and/or hydrogen embrittlement inhibition. Said composition comprises 40-60% by weight of at least one alkali metal carboxylate, 0.1-0.5% by weight of benzoic acid and/or at least one alkali metal benzoate, 0.05-0.5% by weight of at least one alkali metal phosphate, 0.005-0.05% by weight of at least one alkali metal metasilicate, and 0.01-0.15% by weight of succinic acid and/or at least one alkali metal succinate. Balance to 100% by weight is water and said composition is pH adjusted to pH 9-12 by addition of at least one alkali metal hydroxide and/or carbonate. Disclosed is also a method of obtaining corrosion inhibition, conductivity inhibition and/or hydrogen embrittlement inhibition by addition of 0.01-0.15% by weight of succinic acid and/or at least one alkali metal succinate to an aqueous deicing and/or anti-icing composition.

19 Claims, No Drawings

INHIBITED AQUEOUS DEICING COMPOSITION

CROSS-REFERENCE TO RELATED APPLICATIONS

This application is a national stage application (under 35 U.S.C. § 371) of PCT/SE2017/050643, filed Jun. 15, 2017, which claims benefit of Swedish Application No. 1630169-9, filed Jun. 30, 2016, which are incorporated herein by reference in their entireties.

The present invention relates to a corrosion, conductivity and/or hydrogen embrittlement inhibited aqueous deicing and/or anti-icing composition, which composition comprises one or more alkali metal carboxylates as main constituent. In further aspects, the invention relates the use of said composition in deicing and/or anti-icing of snow and/or ice on primarily traffic areas, such as streets, roads and airfield runways, and a method for obtaining corrosion inhibition, conductivity inhibition and/or hydrogen embrittlement inhibition in an aqueous deicing and/or anti-icing composition.

Removal (deicing) and prevention (anti-icing) of frost, ice or snow accumulation on for instance trafficked areas, such as airfield runways, streets, roads, cycle ways, footpaths, sidewalks, bridges, backyards, parking areas, sportsgrounds and similar areas are crucial to avoid substantial impairment in personal, traffic and transport safety. It has therefore long been known to apply to such areas compositions or compounds for melting and/or thawing of snow and ice. The materials from which such areas are made and material from which for instance vehicles and vessels trafficking such areas are made, such as concrete, stone, bitumen and various metals, must not be damaged or otherwise destroyed by a deicing or anti-icing composition. It is thus essential to rule out corrosive actions on for instance metals, especially light metals used in for instance aircrafts and cars. Furthermore, a deicing or anti-icing composition may enter the wastewater and biodegradability is thus a further requirement. It is also essential that very rapid thawing is achieved.

In order to remove snow and ice both solid and liquid deicing and anti-icing compounds and compositions are used. Deicers and anti-icers commonly used in for instance trafficked areas include alkali metal, alkaline earth metal, amine and ammonium carboxylates and salts, such potassium, sodium, lithium, magnesium, calcium and ammonium formate, acetate, propionate, butyrate, isobutyrate, oxalate, malonate, succinate, glutarate, adipate, citrate, gluconate, benzoate, carbonate, bicarbonate, fluoride, chloride and bromide. Further commonly used deicers and anti-icers include urea and glycols, such as ethylene glycol and propylene glycol. Urea is not recommended anymore because it degrades to ammonia having undesired environmental effects, and because urea loses its ability to melt and/or thaw snow and ice at temperatures below 7° C.

An important test for deicing and anti-icing compositions, used in areas such as aircraft runways, is the immersion corrosion test disclosed in ASTM F 483-98, AMS 1431D and AMS 1435C, stating that panels of dichromated magnesium alloy AZ31BH26 must tolerate 5% by weight as well as 15% by weight of an aqueous deicing and/or anti-icing composition, or a liquid deicing and/or anti-icing composition in undiluted form, at 38° C. for 24 hours with a weight change of said panels being less than 0.2 mg/cm².

Many attempts have been made to solve problems, such as corrosion and hydrogen embrittlement, by the use of inhibitors. EP 0 375 214 discloses a liquid deicing composition consisting of 45-60% by weight of an alkali metal acetate and/or alkali metal formate, 0.1-0.4% by weight of an alkali metal phosphate and 0.2-0.6% by weight of an alkali metal nitrite. The inhibitor effect of alkali metal phosphate and alkali metal nitrite leaves much to be desired, especially with regard to magnesium. A further disadvantage is the nitrite content. DE 40 34 217 teaches a liquid or solid deicing composition based on water soluble alkali metal salts of formic and/or acetic acid with a corrosion inhibitor system consisting of water soluble polycarboxylic acids and water soluble alkali silicates and/or carbonates. The deicing composition is said to attack neither constructions of concrete, bitumen or stone, nor metallic materials such as iron, copper, aluminium or zinc. U.S. Pat. No. 4,803,007 describes a deicing composition based on sodium chloride and wherein a mixture of a divalent metal salt and an alkali metal polyphosphate is employed as corrosion inhibitor. Divalent metals mentioned include calcium, magnesium and barium with borates, metasilicates and sulphates as counter ions. This inhibitor combination acts in particular to counter corrosion to ferrous metals, but less so with respect to the corrosion of light metals, such as magnesium. U.S. Pat. No. 6,059,989 teaches a deicing composition consisting essentially of 87-99.45% by weight of an alkali metal acetate and/or formate, 0.5-10% by weight of an alkali metal silicate and 0.05-3% by weight of an alkali metal phosphate as corrosion inhibitor. The composition is claimed to ensure short thaw time and corrosion protection, especially with regard to magnesium. DE 4 034 217 provides a deicing composition comprising an alkali or ammonium formate or acetate, a hydroxyl substituted polycarboxylic acid, an alkali or ammonium silicate or carbonate and a triazole or thiazole as corrosion inhibitor. WO 03/006571 disclose a corrosion inhibitor for use in deicing compositions, which corrosion inhibitor comprises a di or polyhydric compound, a $C_5$-$C_{16}$ aliphatic mono or dibasic acid and optionally a hydrocarbonyl triazol in a ratio polyhydric compound to aliphatic acid of between approx. 10:1 and 1:1.

It is, furthermore, known to use alkali metal metasilicates, for instance sodium metasilicate ($Na_2SiO_3$), including anhydrous species and hydrates thereof, to increase the pH in areas wherein a test metal corrodes only slowly and to give a protective silicate layer. Sodium metasilicates are well-known inhibitors frequently disclosed in the literature. Alkali metal metasilicates do, however, not give enough protection towards corrosion of magnesium in formate solutions, why additional inhibitor(s), such as the frequently used alkali metal phosphates and carboxylates, must be added.

It has now quite surprisingly been found that a very small amount of succinic acid and/or at least one alkali metal succinate results in a substantially improved corrosion inhibition, conductivity inhibition and/or hydrogen embrittlement inhibition in aqueous deicing and/or anti-icing compositions comprising as active deicing and/or anti-icing component at least one alkali metal carboxylate. The present invention accordingly refers to a novel aqueous deicing and/or anti-icing composition comprising 40-60%, such as 45-55%, by weight of at least one alkali metal carboxylate, 0.1-0.5%, such as 0.2-0.4%, by weight of benzoic acid and/or at least one alkali metal benzoate calculated as benzoic acid, 0.05-0.5%, such as 0.1-0.3%, by weight of at least one alkali metal phosphate, 0.005-0.05%, such as 0.01-0.03%, by weight of at least one alkali metal metasilicate, including anhydrous species and hydrates thereof, and 0.01-0.15%, such as 0.05-0.1%, by weight of succinic acid and/or at least one alkali metal succinate calculated as succinic acid. Balance to 100% by weight is water and said composition is pH adjusted to pH 9-12, such as 10-11, by means of addition of at least one alkali metal hydroxide and/or carbonate.

In preferred embodiments of the present invention, said alkali metal is potassium and/or sodium and said carboxylate is formate and/or acetate.

The composition of the present invention comprises in especially preferred embodiments 45-55% by weight of potassium and/or sodium formate and/or acetate, 0.2-0.4% by weight of benzoic acid and/or potassium and/or sodium benzoate calculated as benzoic acid, 0.1-0.2% by weight of potassium and/or sodium phosphate, 0.01-0.03% by weight of potassium and/or sodium metasilicate, including anhydrous species and hydrates thereof, and 0.05-0.1% by weight of succinic acid and/or potassium and/or sodium succinate calculated as succinic acid. Balance to 100% by weight is water and said preferred composition is pH adjusted to pH 10-11 by means of addition of potassium and/or sodium hydroxide and/or carbonate.

The composition according to the present invention may in its various embodiments additionally comprise at least one viscosity modifier, selected from, but not limited to, hydroxyalkyl cellulose, such as hydroxyethyl cellulose, and/or microfibrillated cellulose in an amount of 0.1-1.0% by weight, and/or at least one oxygen scavenger, such as potassium and/or sodium hydrogen phosphite, in an amount of 0.01-0.5% by weight.

In a further aspect, the present invention refers to the use of a composition as disclosed above for deicing and/or anti-icing of trafficked areas, such as airfield runways and taxiways, streets, roads, cycle ways, footpaths, bridges, backyards, parking areas and/or sportsgrounds and/or other areas in need of deicing and/or anti-icing.

The present invention, in yet a further aspect, refers to a method for obtaining corrosion inhibition, conductivity inhibition and/or hydrogen embrittlement inhibition in an aqueous deicing and/or anti-icing composition comprising as active deicing and/or anti-icing component at least one alkali metal carboxylate, such as potassium and/or sodium formate and/or acetate, said method comprises addition of succinic acid and/or at least one alkali metal, such as potassium and/or sodium, succinate in an amount of 0.01-0.15%, such as 0.05-0.10%, by weight calculated as succinic acid on total deicing and/or anti-icing composition. The method further and optionally comprises addition of compounds as disclosed and discussed above in relation to the deicing and/or anti-icing composition according to the present invention, such as addition of benzoic acid and/or at least one alkali metal benzoate, at least one alkali metal phosphate and/or at least one alkali metal metasilicate. The method can of course also comprise addition of viscosity modifiers, oxygen scavengers.

The composition and the method disclosed and discussed above can of course also comprise addition of any other auxiliary or incidental additive known and used in the art and/or required or requested for specific purposes, such colourants, inhibitors, buffers and tracers. Furthermore, said composition can also be used as a non-aqueous deicing and/or anti-icing composition, in form of for instance a powder or granules, wherein water is excluded, as a solvent borne deicing and/or anti-icing composition wherein water is at least partially replaced by one or more organic solvents, such as aliphatic ethers, and/or in combination with other deicing and/or anti-icing compounds and compositions based on for instance ammonium, amine, alkali and/or alkaline earth metal carboxylates and/or halides, and/or in combination with for instance glycols, such as ethylene and/or propylene glycol.

Without further elaboration, it is believed that one skilled in the art can, using the preceding description, utilise the present invention to its fullest extent. In the following, Examples 1-3 are embodiment compositions, Examples 4-6 are comparative Examples and Examples 7-9 refer to testing and evaluation.

EXAMPLE 1—EMBODIMENT

A deicing and/or anti-icing composition was prepared by mixing and dissolving

| | |
|---|---|
| Potassium formate | 50.0% by weight |
| Succinic acid | 0.075% by weight |
| Sodium benzoate | 0 30% by weight |
| Potassium phosphate | 0.15% by weight |
| Sodium metasilicate pentahydrate | 0.015% by weight |

Water was added to the balance 100% by weight and the pH was finally adjusted to 10.5±0.2 by addition of potassium hydroxide.

EXAMPLE 2—EMBODIMENT

Example 1 was repeated with the difference that 0.50% by weight of Exilva Piano (microfibrillated cellulose—Borregard, Norway) was added.

EXAMPLE 3—EMBODIMENT

Example 1 was repeated with the difference that 0.016% by weight of anhydrous sodium metasilicate was added instead of 0.015% by weight of sodium metasilicate pentahydrate.

EXAMPLE 4—COMPARATIVE

Example 1 was repeated with the difference that succinic acid was replaced by the same amount of maleic acid.

EXAMPLE 5—COMPARATIVE

Example 1 was repeated with the difference that succinic acid was replaced by the same amount of azelaic acid.

EXAMPLE 6—COMPARATIVE

Example 1 was repeated with the difference that succinic acid was replaced by the same amount of sebacic acid.

EXAMPLE 7—CORROISON

The deicing/anti-icing compositions according to Examples 1, 3, 4, 5 and 6 were corrosion evaluated using test panels AMS 4376 magnesium alloy, dichromated and treated as in AMS 2475. The panels were allowed to be immersed in the compositions at 38° C. for 24 and 168 hrs and the weight losses were determined by weighing. Results, evidencing the superior corrosion inhibition of the composition according to the present invention, are given below.

| | Weight loss 24 hrs mg/cm² | Weight loss 168 hrs mg/cm² |
|---|---|---|
| Example 1 | 0.04 | 0.11 |
| Example 3 | 0.01 | |
| Example 4 | 0.07 | 5.93 |
| Example 5 | 0.06 | 1.13 |
| Example 6 | 0.05 | 1.23 |

EXAMPLE 8—HYDROGEN EMBRITTLEMENT

Hydrogen embrittlement tests were on the deicing/anti-icing compositions of Examples 1, 2, 3, 4 and 5 performed according to ASTM F 519-13 specimen 1c with following result evidencing the superior hydrogen embrittlement inhibition of the composition of the present invention:

| | |
|---|---|
| Example 1 | Pass (>144 hrs.) |
| Example 2 | Pass (>144 hrs.) |
| Example 3 | Pass (>144 hrs.) |
| Example 4 | Fail (<50 hrs.) |
| Example 5 | Fail (<50 hrs.) |

EXAMPLE 9—RHEOLOGY

The viscosity and shear rate, at 23° C. and a shear rate interval of 10-100 s⁻¹, of the deicing/anti-icing compositions according to embodiment Examples 1 and 2 were determined with following result:

| | Viscosity mPas | Shear rate 1/s |
|---|---|---|
| Example 1 | 2.8 | 30 |
| Example 2 | 98 | 30 |

The invention claimed is:

1. An aqueous deicing and/or anti-icing composition, said composition comprising:
   40-60% by weight of at least one alkali metal carboxylate,
   0.1-0.5% by weight of benzoic acid and/or at least one alkali metal benzoate calculated as benzoic acid,
   0.05-0.5% by weight of at least one alkali metal phosphate,
   0.005-0.05% by weight of at least one alkali metal metasilicate, and
   0.01-0.15% by weight of succinic acid and/or at least one alkali metal succinate calculated as succinic acid,
   the balance to 100% by weight being water, and
   said composition being pH adjusted to pH 9-12 by addition of at least one alkali metal hydroxide and/or carbonate.

2. The composition according to claim 1, said composition comprising:
   45-55% by weight of at least one alkali metal carboxylate,
   0.2-04% by weight of benzoic acid and/or at least one alkali metal benzoate calculated as benzoic acid,
   0.1-0.2% by weight of at least one alkali metal phosphate,
   0.01-0.03% by weight of at least one alkali metal metasilicate, and
   0.05-0.1% by weight of succinic acid and/or at least one alkali metal succinate calculated as succinic acid,
   the balance to 100% by weight being water, and
   said composition being pH adjusted to pH 10-11 by addition of at least one alkali metal hydroxide and/or carbonate.

3. The composition according to claim 1, said at least one alkali metal metasilicate being at least one alkali metal silicate.

4. The composition according to claim 1, said alkali metal being potassium and/or sodium.

5. The composition according to claim 1, said carboxylate being formate and/or acetate.

6. The composition according to claim 1 comprising:
   45-55% by weight of potassium and/or sodium formate and/or acetate,
   0.2-0.4% by weight of benzoic acid and/or potassium and/or sodium benzoate calculated as benzoic acid,
   0.1-0.3% by weight of potassium and/or sodium phosphate,
   0.01-0.03% by weight of potassium and/or sodium metasilicate and/or an anhydrous species and/or a hydrate thereof, and
   0.05-0.1% by weight of succinic acid and/or potassium and/or sodium succinate calculated as succinic acid,
   the balance to 100% by weight being water, and
   said composition being pH adjusted to pH 10-11 by addition of potassium and/or sodium hydroxide or carbonate.

7. The composition according to claim 1 additionally comprising at least one viscosity modifier in an amount of 0.1-1.0% by weight.

8. The composition according to claim 7, said at least one viscosity modifier being at least one hydroxyalkyl cellulose.

9. The composition according to claim 8, said at least one hydroxyalkyl cellulose being hydroxyethyl cellulose.

10. The composition according to claim 7, said at least one viscosity modifier being at least one microfibrillated cellulose.

11. The composition according to claim 1 additionally comprising at least one oxygen scavenger in an amount of 0.01-0.5% by weight.

12. The composition according to claim 11, said at least one oxygen scavenger being potassium and/or sodium hydrogen sulphite.

13. A method for deicing and/or anti-icing an area in need of deicing and/or anti-icing, the method comprising application of a composition according to claim 1 to the area.

14. The method according to claim 13, wherein the area is selected from airfield runways and taxiways, streets, roads, cycle ways, footpaths, sidewalks, bridges, backyards, parking areas, and sportsgrounds.

15. A method for obtaining corrosion inhibition, conductivity inhibition and/or hydrogen embrittlement inhibition in an aqueous deicing and/or anti-icing composition comprising as active deicing and/or anti-icing component at least one alkali metal carboxylate, said method comprising addition of succinic acid and/or at least one alkali metal succinate in an amount of 0.01-0.15% by weight calculated as succinic acid, and said method further comprising addition of benzoic acid and/or at least one alkali metal benzoate, at least one alkali metal phosphate and at least one alkali metal metasilicate.

16. The method according to claim 15, said method comprising addition of succinic acid and/or at least one alkali metal succinate in an amount of 0.05-0.10% by weight calculated as succinic acid.

17. The method according to claim 15, said alkali metal succinate being potassium and/or sodium succinate.

18. The method according to claim 15, said method further comprising pH adjustment of said deicing and/or anti-icing composition by addition of at least one alkali metal hydroxide and/or carbonate to pH 9-12.

19. The method according to claim 15, said alkali metal being potassium and/or sodium and said carboxylate being formate and/or acetate.

\* \* \* \* \*